United States Patent [19]
Hüttner et al.

[11] 3,916,208
[45] Oct. 28, 1975

[54] ADAPTER

[75] Inventors: Robert Hüttner, Erlangen; Günter Krumrey, Weisendorf; Wilhelm Stöckl, Furth-Sack, all of Germany

[73] Assignee: Siemens Aktiengesellschaft, Munich, Germany

[22] Filed: Aug. 20, 1974

[21] Appl. No.: 498,912

Related U.S. Application Data

[63] Continuation of Ser. No. 334,815, Feb. 22, 1973, abandoned.

[52] U.S. Cl. ................................. 250/468; 250/475
[51] Int. Cl.² ........................................ G03B 41/16
[58] Field of Search ........... 250/468, 469, 470, 471, 250/475, 477

[56] References Cited
UNITED STATES PATENTS
3,111,585   11/1963   Sano ................................. 250/468
3,191,031   6/1965   Sano ................................. 250/468

*Primary Examiner*—Craig E. Church
*Attorney, Agent, or Firm*—V. Alexander Scher

[57] ABSTRACT

An adapter for connecting film receiving cassettes for roller films, particularly those of X-ray examining apparatus, to developing automats, has a light protecting cover for the passage of the film between the film receiving cassette and the slit introducing the film into the developing automat. The invention is particularly characterized by the provision of a film guide operated independently from the drive of the developing automat which receives the beginning of the film and when the light cover is closed can be actuaged for inserting it into the film receiving slit.

4 Claims, 1 Drawing Figure

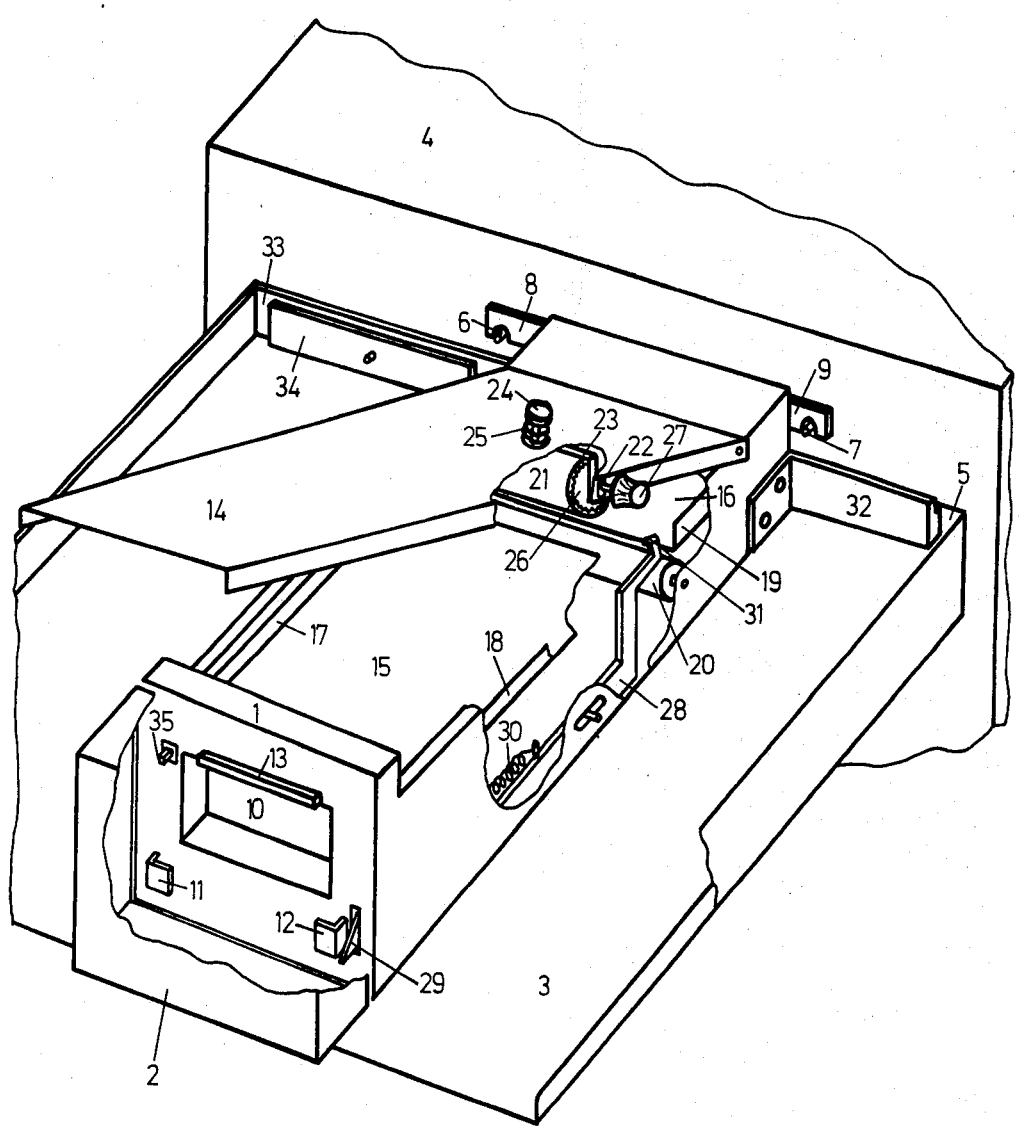

ADAPTER

This is a continuation of application Ser. No. 334,815 filed Feb. 22, 1973 and now abandoned.

This invention relates to an adapter for connecting film receiving cassettes for roller films, particularly those of X-ray examining apparatus, to developing automats and having a light protecting cover for the passage of the film between the film receiving cassette and the slit introducing the film into the developing automat.

X-ray sections of hospitals and large private establishments accumulate large amounts of exposed roller film and sheet film material depending upon the type of used X-ray examining devices. In such X-ray sections mostly developing automats are used for developing the accumulated X-ray films. These developing automats mostly have a supporting plate located in front of the film introducing slit. X-ray sheet films removed from the film cassettes are placed in the dark upon the plate and then they can be shifted thereon through the film introducing slit. To make possible the development of roller films as well with these developing automats, it is known to provide supports on the outside upon the automats, the supports having an axle fixed thereon, upon which a film spool can be mounted. A particular drawback of this arrangement is that an exposed film received a film receiving cassette must be first wound in darkness upon an empty film spool, this spool must be stuck in darkness upon the axle of the developing automat and then the free end of the film must be pushed through the film introducing slit of the automat also in darkness. After these operations the dark chamber in which the developing automat is located, remains unavailable for other work due to the required darkness during all the time while the roller film is wound into the automat.

A roller film adapter plate is also known which can be screwed to the front edge of the supporting plate of a developing automat and which has guides for holding a cassette carrying roller films. When such a roller film adapter plate is used the rewinding of the roller film is eliminated. When the film carrying cassette is placed upon the adapter plate the exposed roller film located therein must be pulled out to a small extent. To this film end must be glued the so-called film prestress or film leader the length of which is adapted to the distance between the cassette and the slit of the automat. This film leader is pushed with its free end into the slit. As soon as the transporting rollers of the automat grasp the film leader, it is pulled along with the following roller film glued thereto through the developing automat. In this known construction the film passage between the cassette and the film receiving slit of the automat is protected from direct light by a U-shaped light protecting covering. Nevertheless, when this known roller film adapter plate is used, the operation must be carried out in complete darkness, since at the moment when the film leader is engaged and pulled by the transporting rollers of the automat, namely, prior to the closing of the light covering fresh film is already pulled out of the cassette, whereby in all cases where the film leader was not pulled precisely perpendicularly through the slit in darkness, the film could run sidewise out of the U-shaped light protecting cover and be struck by light. In addition, in actual practice these U-shaped protecting covers cannot be placed completely light tightly upon the supporting plates of the automat due to differences in tolerances which can be hardly avoided.

An object of the present invention is the provision of a device which during development of roller films in cassettes of X-ray examining devices, will avoid all operations which must be carried out in darkness.

Other objects of the present invention will become apparent in the course of the following specification.

In the accomplishment of the objectives of the present invention it was found desirable to provide a film guiding device which operates independently from the drive of the developing automat, which receives the beginning of the film and which when the light cover is closed can be actuated to insert it into the film receiving slit.

This has the great advantage that all operations can be carried out in daylight and that the operation of the dark chamber will not be subjected to any limitations any more due to the development of roller films.

A premature pulling out of the roller film while the light cover is still open, can be avoided when the film guiding device is at least partly connected with the light cover and can be coupled with the front end of the film only when the light cover is closed.

According to an advantageous embodiment of the present invention manually operable film supplying rolls can be provided in the film passage between the cassette and the film receiving slit of the automat. This makes it possible after the closing of the light cover in daylight to insert the film into the slit by mere rotation of the film supplying rolls.

The operational safety of the adapter can be increased if at least one film supplying roll is provided with a blocking device which becomes inoperable only after a complete placing of the cassette when its closure is opened by engagement with an impact ledge of the adapter. This prevents the pulling of the film through closed lock of the cassette as the result of which the film may be scratched. In this manner the person turning the film supplying rolls will become aware of the fact that the cassette was not set correctly, namely, not light tightly coupled to the adapter.

According to a preferred further embodiment of the present invention at least one film supplying roll can be movably mounted and can be pushed by hand in opposition to the force of a spring against the film roll. In this construction the film roll or a film leader glued to the film is pressed against the film supplying rolls only during the actuation of a pressure key. This arrangement not only avoids unnecessary friction but also provides the possibility of using film supplying rolls which are continuously motor driven. The insertion of the film roll into the automat can then take place merely by actuating the pressure key by means of which the film supplying rolls are pressed against the film leader or the film.

A further improvement of the operational safety of the adapter can be provided when side guides for the film are arranged directly in front of the film receiving slit of the automat. This assures that the film roll will run vertically into the automat. This is particularly important for automats with a wide slit which must be used in X-ray sections due to the necessity of developing X-ray sheet films of large size.

The invention will appear more clearly from the following detailed description when taken in connection with the accompanying drawing the sole FIGURE of which is a perspective view partly broken off of a device for developing exposed film rolls.

The drawing shows an adapter 1 mounted upon the supporting plate 3 of a developing automat 4 and receiving film cassettes 2.

In the illustrated construction the adapter 1 is hung by hooks 8 and 9 upon supporting nipples 6 and 7 above the film receiving slit 5 of the developing automat 4. The side of the adapter 1 directed away from the automat 4 has a window 10 for the passage of film rolls and guides 11 and 12 for holding the film cassette 2.

Directly above the window 10 of the adapter there is an impact ridge 13 which presses against the lock of the cassette when it is coupled. The adapter 1 has a swingable cover 14. Within the adapter there are two guiding sheets 15, 16 with bent side edges 17, 18, 19, along which film rolls are guided to the film receiving slit 5 of the automat 4. A lower film guiding roller 20 is located between the two guiding sheets. An upper film guiding roller 21 is located upon the light-tight closing cover 14 of the adapter 1 above the lower roller 20. The upper roller 21 is movable vertically to the film surface through longitudinal slots 22. This upper roller 21 carries upon its both axle ends a U-shaped strap 23 which is connected with a pressure key 24 extending over cover and pressing by a spring 25 against the cover. Within the cover a toothed wheel 26 is fixed upon the axle of the upper film guiding roller 21, while outside the cover a rotary grip 27 is fixed. A bolt 28 is located within the adapter and is movable in the longitudinal direction of the film sidewise of the film guiding sheets 15, 16. The bolt is provided with an extending lug 29 which is pushed into the adapter 1 against the force of a spring 30 when the cassette 2 is pushed in. On the other end of the bolt a tooth 31 is provided which when the cover 14 is closed and the lug 29 is not pushed in, engages the teeth of the gear wheel 26 of the upper film guiding roller 21 and stops this roller. Covering sheets 32, 33 are located upon the side of the adapter directed toward the automat 4 on both sides of the film passage; these sheets protect the side ranges of the film receiving slit 5 of the automat 4 against incoming light. In the illustrated example one of these covers 33 is provided with a light-tight lid 34 which can be opened by hand. On the side of the adapter 1 directed toward the film cassette 2 a projecting stop pin 35 is located which is resiliently supported and which is pushed by the cover 14 into the adapter when the cover is being closed.

If an exposed X-ray film wound in a film receiving cassette of an X-ray examining apparatus is to be developed, it suffices to push the cassette in the guides 11 of the adapter 1. After the opening of the cover 14 of the adapter the exposed film can be pulled out of the cassette to the extent of a few centimeters, so that at its free end a film leader of the length of the plate 3 of the automat 4 can be glued. After that the film leader is placed upon the guiding sheets 15 and 16 and the lower film guiding roller 20 of the adapter 1. Then the cover 14 of the adapter is closed. In order to insert the film into the slit 5 of the automat 4, it suffices to turn the rotary handle 27 of the upper film guiding roller 21 by hand and to press the upper film guiding roller by the pressure pin 24 against the film leader and the lower film guiding roller 20. If the rotary handle 27 does not turn, this is an indication that the film carrying cassette was not fully inserted in the guides 11, 12 of the adapter 1 and that the lock 28 with its tooth 31 is still in engagement with the gear wheel 26 of the upper film guiding roller 21. As soon as the cassette is pushed up to the stop in the guides 11, 12 of the adapter, the lock of the cassette 2 is pushed up by the ridge 13 of the adapter 1 and the lug 29 of the lock 28 is pushed into the adapter. In this position of the lock 28 the upper film supplying roller 21 is freed. Then the rotary handle 27 can be rotated and the film roll is moved into the film receiving slit 5 of the automat 4.

The resiliently supported pin 35 prevents pressure of the cassette 2 in the adapter, its closure having been opened by the ridge 13 as long as the cover 14 of the adapter is open. Only after the closing of the cover, when the pin is pressed into the adapter by the cover, the lock of the cassette can open during its insertion. This eliminates any possibility that the film located in the cassette will be exposed to light as the result of an error.

As soon as the film leader has been grasped by the transporting rollers of the automat, it will be further transported by it, as is apparent from the automatic rotation of the film guiding rollers 20, 21 and thus of the rotary handle 27, as long as they are pressed by the pressure key 24 against the film. The side shifting of the film strip is prevented by the side edges 17, 18, 19 of the guide sheets 15, 16. The covers 32, 33 of the side ranges of the film inserting slit 5 of the automat prevent light from reaching the roll film when there is daylight in the dark chamber. If the chamber wherein the automat is located is made dark and then the cover 34 of the side covering 33 is opened, sheet films can be supplied to the developing automat along with the film roll.

Various changes can be made in the illustrated embodiment. Thus the film guiding rollers can be arranged directly below the window 10 of the adapter. In such construction the gluing of the film leader can be eliminated so long as the connected developing automat is constructed for the treatment of film rollers without film leader or film leader band.

What is claimed is:

1. An adapter for connecting a receiving cassette for rolled film, particularly for those used in X-ray examining devices, to a developing automat having an inlet slit for the insertion of the film to be developed, the adapter having a light-tight housing comprising a cover, first means guiding said film through said housing into said slit, and second means connected with the end of the film only when the cover is closed, for pulling the film out of the receiving cassette and feeding it into said slit, said second means comprising manually operated film-feeding rollers located in the film passage between the receiving cassette and said slit; cassette receiving means, a stop bar for opening the shutter of the receiving cassette when said cassette is fully positioned in said cassette receiving means, at least one of said film-feeding rollers comprising a locking device which is disengaged only when a receiving cassette has been fully positioned in the cassette receiving means, lateral guides guiding the film perpendicularly into said slit, a light-tight housing enclosing from all sides the film passage between said cassette and said slit, a light-tight closing cover in said film passage, and masking means covering those portions of said slit extending to the sides of the film passage of the adapter, said masking means being manually operable flaps enabling the automat to be also used for the simultaneous development of sheet film and roll film.

2. An adapter according to claim 1, having a spring, wherein at least one of said film-feeding rollers is displaceably mounted and is adapted to be manually pressed into contact with the film against the force of said spring.

3. An adapter according to claim 1, wherein said masking means project into said slit.

4. An adapter according to claim 1, comprising a stop pin actuated by said cover which projects only when said cover is not completely closed and thus prevents the cassette from engaging completely with the adapter.

\* \* \* \* \*